United States Patent [19]

Johnson

[11] Patent Number: 5,787,384
[45] Date of Patent: Jul. 28, 1998

[54] APPARATUS AND METHOD FOR DETERMINING VELOCITY OF A PLATFORM

[75] Inventor: Gregory Bengt Johnson, West Jorden, Utah

[73] Assignee: E-Systems, Inc., Dallas, Tex.

[21] Appl. No.: 561,689

[22] Filed: Nov. 22, 1995

[51] Int. Cl.$^6$ .......................... G01C 21/10; G01C 21/16; G01C 23/00
[52] U.S. Cl. ................................ 701/216; 701/220
[58] Field of Search .................. 364/449, 95, 453, 364/454; 342/357, 457; 701/216, 220, 221

[56] References Cited

U.S. PATENT DOCUMENTS

| | | | |
|---|---|---|---|
| 3,702,477 | 11/1972 | Brown | 343/112 C |
| 4,405,986 | 9/1983 | Gray | 364/434 |
| 4,485,383 | 11/1984 | Maher | 343/352 |
| 4,646,096 | 2/1987 | Brown | 342/357 |
| 4,751,512 | 6/1988 | Longaker | 342/357 |
| 5,051,751 | 9/1991 | Gray | 342/107 |
| 5,202,829 | 4/1993 | Geier | 364/449 |
| 5,266,958 | 11/1993 | Durboraw, III | 342/357 |
| 5,323,322 | 6/1994 | Mueller et al. | 364/449 |
| 5,343,209 | 8/1994 | Sennott et al. | 342/357 |
| 5,390,124 | 2/1995 | Kyrtsos | 364/449 |
| 5,543,804 | 8/1996 | Buchler et al. | 342/357 |
| 5,583,774 | 12/1996 | Diesel | 364/443 |

*Primary Examiner*—Michael Zanelli
*Attorney, Agent, or Firm*—Baker & Botts, L.L.P.

[57] ABSTRACT

An apparatus and method for determining the velocity of a platform includes a GPS receiver and inertial measurement unit (IMU) located at the platform. The GPS receiver provides GPS navigation data using a plurality of GPS satellites while the inertial measurement unit provides inertial navigation data. Acceleration computed from the GPS navigation data is combined with the inertial acceleration generated from the IMU using a Kalman filter to generate a substantially IMU-bias free acceleration of the platform. The resultant acceleration measurement and the GPS navigation data are used to calculate the velocity of the platform in conjunction with a second Kalman filter for removing GPS systematic errors that are normally removed by use of a ground reference station.

43 Claims, 5 Drawing Sheets

# APPARATUS AND METHOD FOR DETERMINING VELOCITY OF A PLATFORM

TECHNICAL FIELD

The present invention relates to an apparatus and method for determining the velocity of a platform and, in particular, to an apparatus and method for determining the velocity of a platform without using a ground station.

BACKGROUND OF THE INVENTION

The Global Positing System (GPS) is a satellite-based navigation system that continuously transmits timing, frequency, and satellite position information to potential users. The GPS consists of a full constellation of twenty-four (24) satellites in half geosynchronous orbits. The position of the GPS satellites is controlled and monitored by the Department of Defense (DoD). GPS satellites continuously emit coded GPS signals. The GPS signal contains timing information that allows a user to determine the time elapsed for the GPS signal to transverse the distance between the GPS satellite and the user (the platform). By knowing the time the GPS signal left the GPS satellite, the time the GPS signal arrived at the user, and the speed of the GPS signal, the user can determine the distance from itself to the GPS satellite. By knowing the position of the GPS satellite (ephemeris data), and the distance from itself to the GPS satellite, the user can successfully triangulate its own position.

A user can also determine its own velocity by processing carrier frequency information. All GPS satellites broadcast on two carrier frequencies, referred to as the L1 and L2 carrier frequencies. The carrier frequencies are closely monitored by the DoD to ensure carrier frequency integrity. However, the GPS satellite frequency as measured by the user will change proportional to the relative velocity between the GPS satellite and user. This is known as the Doppler shift. In a similar manner as the above position solution, the user can determine its own velocity by knowing the GPS satellite to user relative velocity (Doppler shift), and the velocity of the GPS satellite. The user knows the velocity of the GPS satellite by the ephemeris information that the GPS satellite transmits to the user. As such, measurements of Doppler shift in the carrier frequency may be used to determine velocity.

To obtain a velocity measurement more accurate than that acquired by measuring and using carrier frequency Doppler shift alone, a ground reference station is utilized. Most high accuracy systems require the use of a ground station to process differential corrections commonly referred to as Differential GPS (DGPS). The satellite-user GPS system has systematic errors that degrade the position and velocity solution. These errors can be corrected for by establishing a fixed reference station that knows its position. The reference station also knows its own velocity, that of zero velocity. The reference station monitors the GPS satellite signals and compares computed range and range-rate solutions against measured solutions. Because the reference station knows its own position and velocity accurately, it can determine the common errors in the GPS satellite system. The reference station then transmit these corrections to the user.

In an effort to increase the accuracy of velocity measurements, inertial measurement units have been added to the platform to add more information to the velocity solution. In these GPS/Inertial Navigation Systems (GPS/INS), the inertial system measures platform acceleration and rotation using accelerometers and gyroscopes. The GPS/INS then integrates the acceleration measurements to calculate velocity, and integrates again to calculate position, while using the lower rate GPS measurements to bound the high rate inertial systems. However, small bias errors in the raw inertial measurements accumulate over time to yield a drifting velocity and position solution. In order to achieve high accurate velocity measurements, the inertial systems must be high grade and high cost. These GPS/INS may further use Doppler shift alone or Doppler shift in conjunction with a ground station to obtain a more accurate velocity measurement.

Accordingly, there exists a need for an apparatus and method for computing an accurate velocity (and position) solution of a platform without using a ground station by estimating the common errors that DGPS would measure instead of using a ground station to measure these common errors. Further, there is a need for an apparatus and method capable of providing an accurate velocity measurement for a platform at a relatively high update rate. Additionally, there exists a need for an apparatus and method for making inertial measurements of a platform and combining the inertial measurements with GPS measurements made at the platform to provide an accurate velocity measurement of the platform using low cost GPS receivers and inertial systems. Also needed is an apparatus and method using GPS carrier phase (CP) range rate measurements, without using a ground station, that estimates constant CP range rate errors and removes bias errors in inertial measurements to provide an accurate velocity measurement of a platform.

SUMMARY OF THE INVENTION

According to the present invention, there is provided an apparatus and method for determining the velocity of a platform using a satellite-based navigation system. The apparatus includes a GPS receiver located at the platform that receives a plurality of GPS signals from a corresponding plurality of GPS satellites and outputs GPS navigation data. An inertial measurement unit located at the platform outputs inertial navigation data relating to the inertial movement of the platform. From the GPS navigation data and the inertial navigation data, the acceleration of the platform is processed. A processor further processes the GPS navigation data and the acceleration of the platform to generate the velocity of the platform.

In a preferred embodiment, the present invention includes a GPS receiver located at the platform for receiving a plurality of GPS signals from a corresponding plurality of GPS satellites and outputting GPS navigation data. An inertial measurement unit is located at the platform for outputting inertial navigation data relating to the inertial movement of the platform. A processor generates a first acceleration measurement of the platform from the GPS navigation data and generates a second acceleration measurement of the platform from the inertial navigation data. The apparatus further includes an acceleration bias remover that receives and combines the first acceleration measurement and the second acceleration measurement to substantially remove the acceleration bias generated by the inertial measurement unit. A processor processes the GPS navigation data and the substantially bias-free acceleration to generate a velocity signal indicative of the velocity of the platform. Preferable, the processor includes a Kalman filter for filtering GPS systematic errors from the velocity signal.

DESCRIPTION OF THE DRAWINGS

For a more complete understanding of the present invention and the advantages thereof, reference is made to the following detailed description taken in conjunction with the accompanying drawings wherein.

DETAILED DESCRIPTION

With reference to the drawings, like reference characters designate like or similar parts throughout the drawings.

Figure 1:
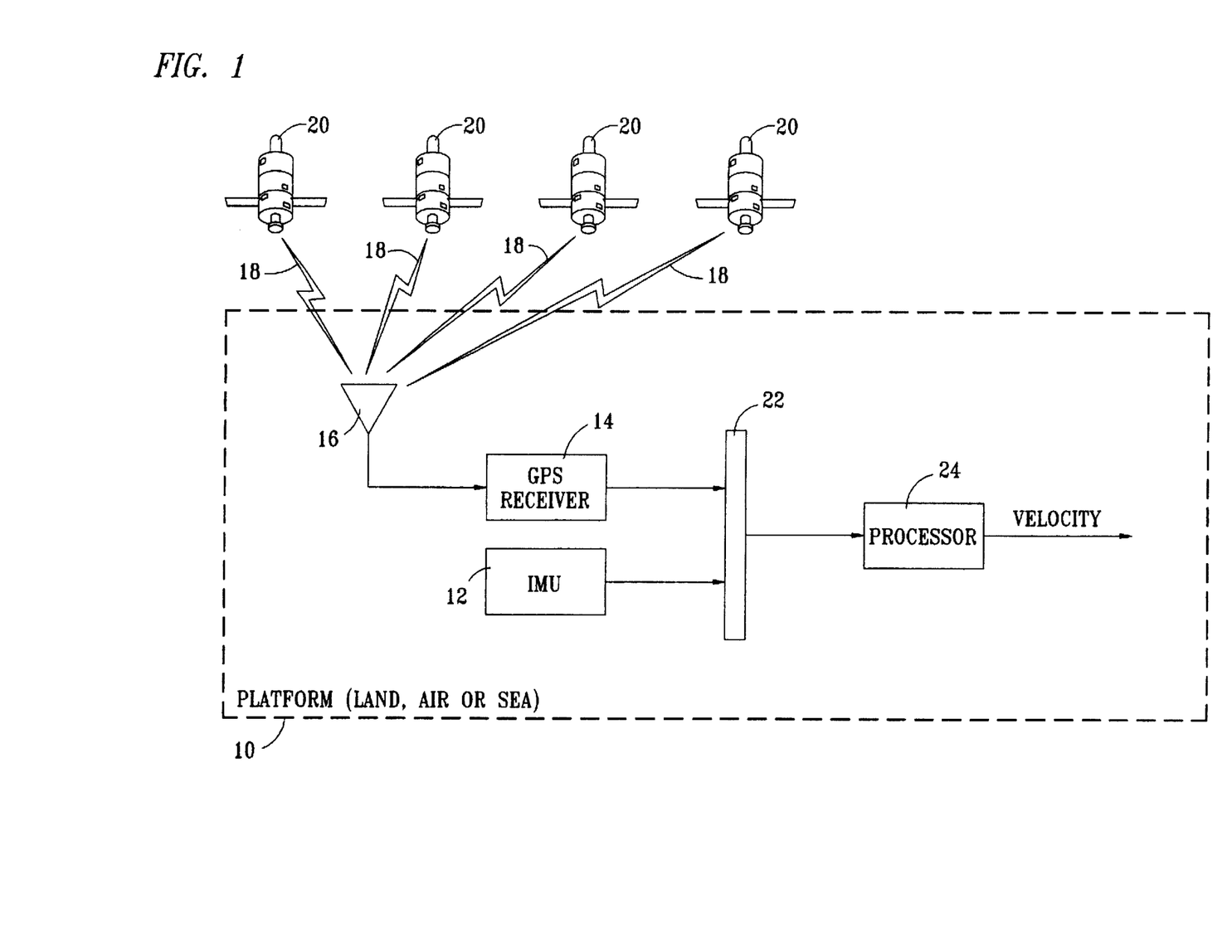
FIG. 1 is a block diagram illustrating the apparatus in accordance with the present invention.

With reference to FIG. 1, there is shown an apparatus in accordance with the present invention. A platform 10 is shown having an inertial measurement unit (IMU) 12 and a GPS receiver 14 located at the platform 10. As will be appreciated, the platform 10 can be a land, sea and/or air based vehicle or object. The GPS receiver 14 includes an antenna 16 receiving a plurality of GPS signals 18 from a plurality of GPS satellites 20. The GPS receiver 14 generates GPS navigation data from the GPS signals 18 and transmits the GPS navigation data over bus 22 to a processor 24. The IMU 12 measures inertial acceleration and rotation of the platform 10 and transmits this inertial navigation data to the processor 24 over the bus 22. The processor 24 calculates or computes the velocity of the platform from the inertial navigation data and the GPS navigation data received from the IMU 12 and the GPS receiver 14, respectively.

Figure 2:
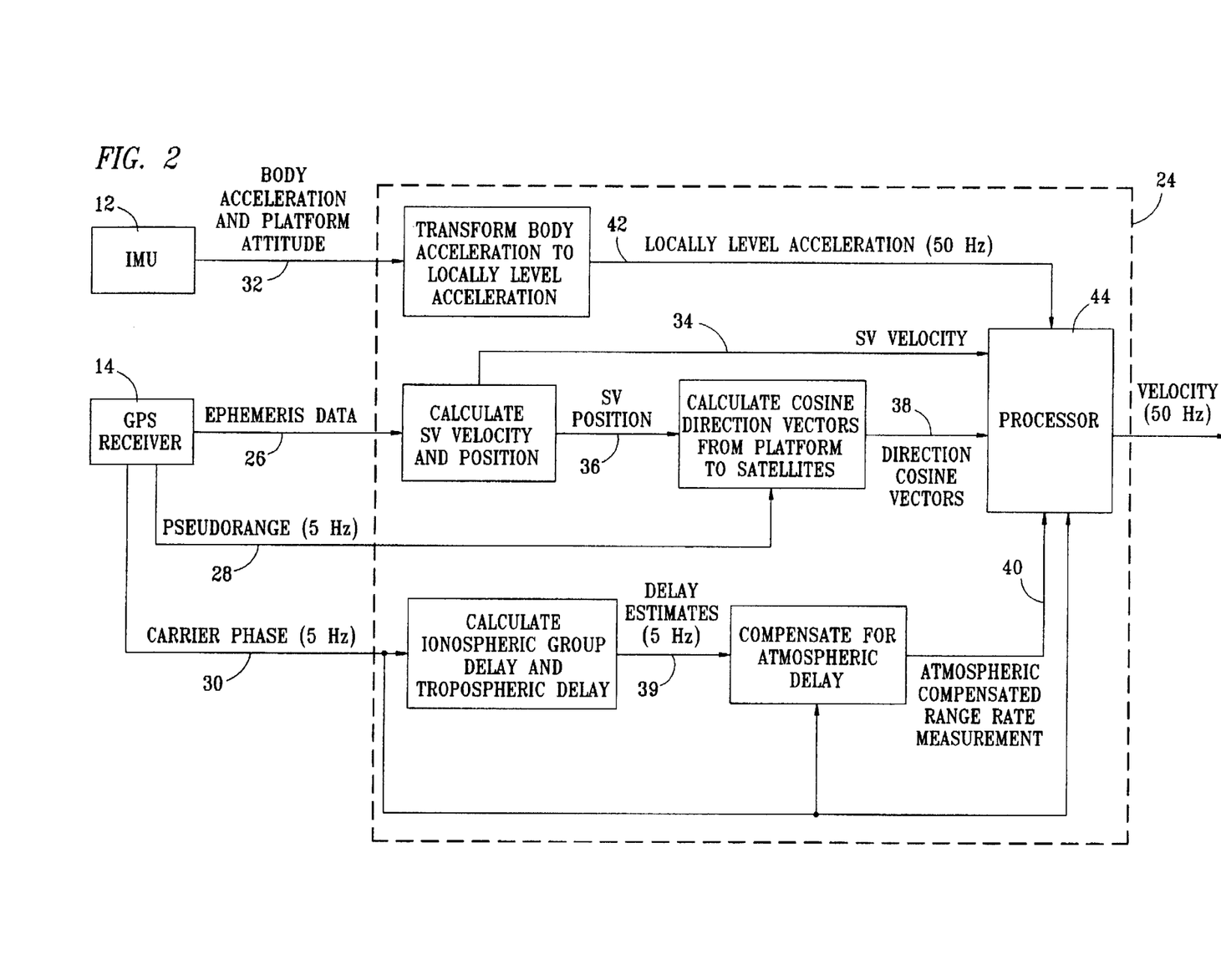
FIG. 2 is a block diagram illustrating a processor shown in FIG. 1 in accordance with the present invention.

Now referring to FIG. 2, there is shown a more detailed description of the processor 24 shown in FIG. 1. The processor 24 receives body acceleration and platform attitude data 32 generated by the IMU 12. The body acceleration and platform attitude is measured by the IMU 12 in a reference field with respect to the platform 10 itself. That is, the body acceleration and platform attitude measurements are referenced to a particular reference point peculiar to the platform 10. For example, if the platform 10 was an aircraft, the body acceleration would generally have three acceleration components—(1) the pointing direction of the aircraft, (2) direction of the right wing and (3) direction straight up from the aircraft. Further, the platform attitude includes roll, pitch, and yaw data measurements.

Using this information, the processor 24 transforms body acceleration of the platform 10 to locally level acceleration data 42 of the platform. The locally level acceleration data 42 is a three-component acceleration measurement including east direction, north direction and up direction acceleration components. As will be appreciated, any desired coordinate system or systems may be used, however, those disclosed are preferred.

The processor 24 also receives ephemeris data 26, pseudorange data 28 and carrier phase range rates 30 generated by the GPS receiver 14. The ephemeris data includes the set of orbital parameters for each of the GPS satellites 20. The pseudorange data 28 includes pseudorange measurements calculated by the GPS receiver 14. Depending on the particular GPS receiver 14 used, the carrier phase range rates 30 may either be true carrier phase range rates or carrier phase range measurements generated by the GPS receiver 14. If the receiver 14 is of a type that generates carrier phase range measurements, the present invention will differentiate the carrier phase range measurements to generate the carrier phase range rates 30. In the preferred embodiment, the GPS receiver 14 generates carrier phase range rates 30. From the received ephemeris data 26, the processor 24 calculates or computes satellite (SV) velocity 34 and SV position 36 of each of the GPS satellites. Using the SV velocity 34, SV position 36, and pseudorange data 28, the processor 24 calculates cosine direction vectors 38. The direction vectors 38 are the directional vectors of the platform 10 to each of the GPS satellites.

The processor 24 receives the carrier phase range rates 30 and generates an atmospheric delay estimate 39. The atmospheric delay estimate 39 includes two components—(1) ionospheric group delay and tropospheric delay. The residual ionospheric group delay is calculated using the difference between the carrier phase range rates 30 and both the L1 and the L2 carrier frequencies, sometimes referred to as dual frequency difference or correction. The tropospheric delay is a function of SV altitude, temperature, SV elevation angle and other atmospheric conditions, and is calculated according to a model well known in the art. Once the atmospheric delay estimate 39 is calculated, the processor 24 compensates for the delay estimate 39 to generate atmospheric compensated carrier phase range rates 40.

As shown in FIG. 2, the locally level acceleration data 42, the SV velocity 34, the direction vectors 38, the compensated carrier phase range rates 40 and the uncompensated carrier phase range rates 30 are all input to a subprocessor 44 for calculating the velocity of the platform 10. As will be appreciated, the subprocessor 44 and the processor 24 can be the same processor or two separate processors. Further, the numbers in parentheses (e.g. 5 Hz) indicates preferred update rates for these signals or calculations. It will be understood that other update rates may be used depending on the equipment used and/or speed of the processors.

Figure 3:
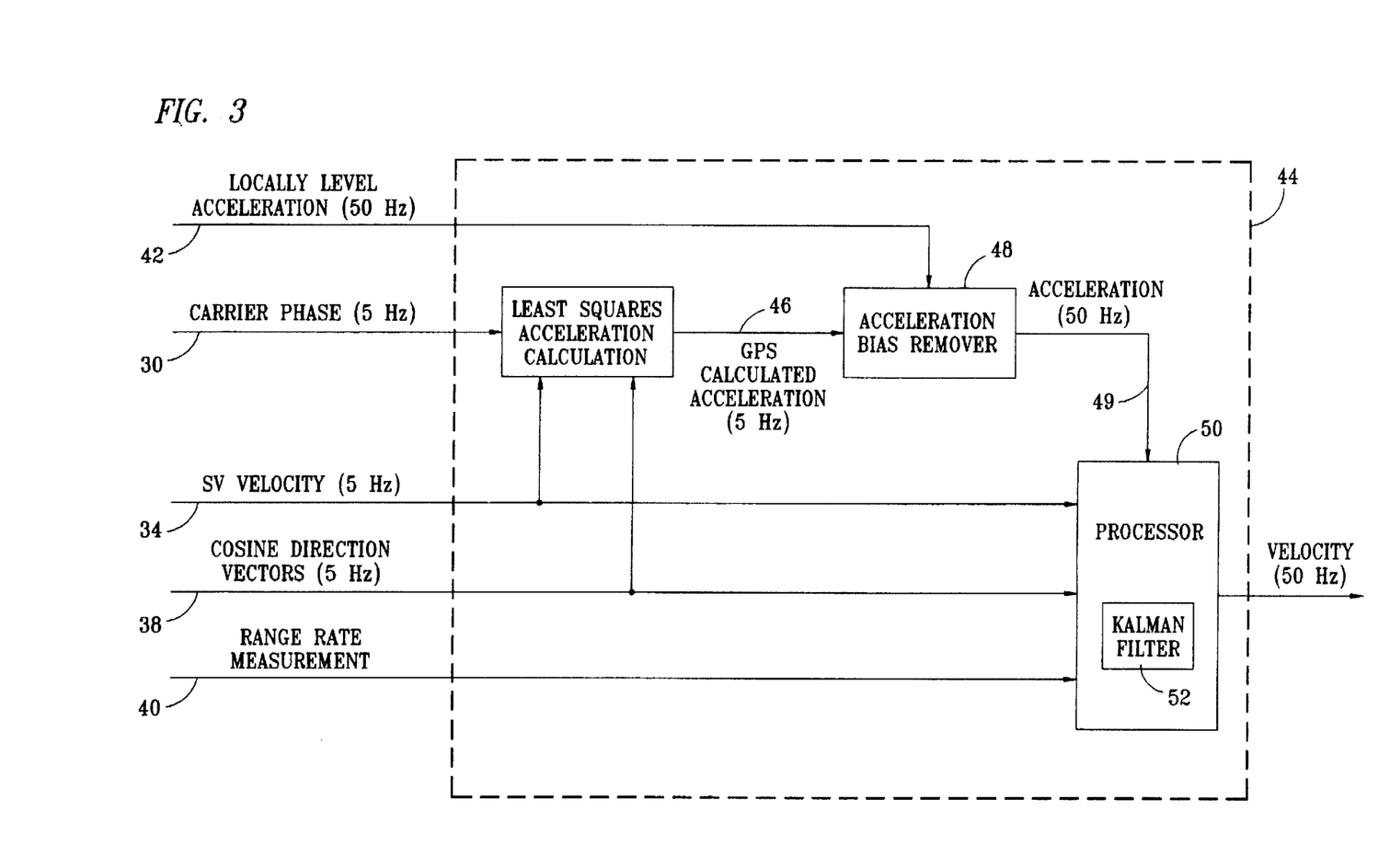
FIG. 3 illustrates an acceleration bias remover and a processor for generating the velocity of the platform.

Now referring to FIG. 3, there is illustrated the subprocessor 44 shown in FIG. 2. The subprocessor 44 performs a least squares calculation using the carrier phase range rates 30, the SV velocity 34 and the direction vectors 38 to calculate GPS-based acceleration data 46 of the platform 10. The subprocessor 44 includes an acceleration bias remover 48 (or acceleration smoother) receiving the locally level acceleration 42 (IMU-based) and the GPS-based acceleration 46 and generating an acceleration 49 of the platform 10. The acceleration bias remover 48 filters acceleration bias errors generated by the IMU 12 and inherent in the locally level acceleration 42. The acceleration bias remover 48 "smooths" the acceleration measurements and generates a smoothed acceleration measurement 49 for the platform 10.

Figure 4:
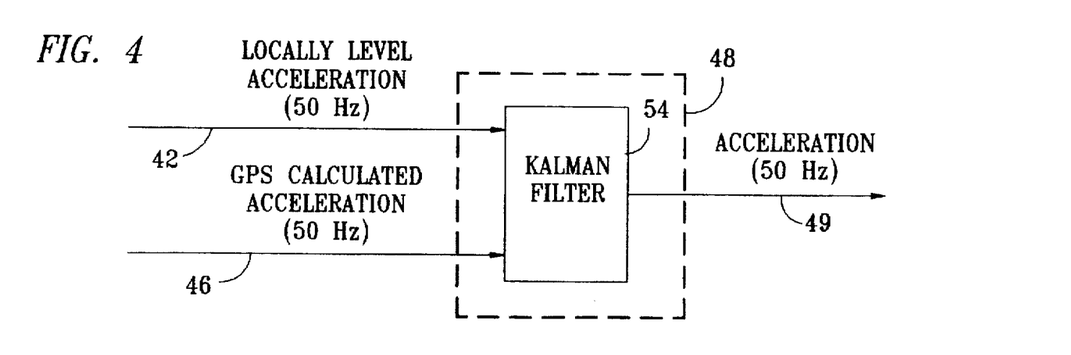
FIG. 4 illustrates the acceleration bias remover including a Kalman filter.

Now referring to FIG. 4, there is shown a more detailed illustration of the acceleration bias remover 48. In the preferred embodiment, the acceleration bias remover 48 includes a one-state Kalman filter 54 that removes or filters the bias from the IMU acceleration 42 by bounding it with the GPS-based acceleration 46 to generate the acceleration 49 of the platform. The equations for the acceleration bias remover are as follows:

$$A_n^- = A_{n-1}^+ + a_n^{imu} - a_{n-1}^{imu} \qquad (1)$$

$$P_n^- = P_{n-1}^+ + Q \qquad (2)$$

$$K_n = \frac{P_n^-}{P_n^- + R} \qquad (3)$$

$$P_n^+ = P_n^-(1-K) \qquad (4)$$

$$A_n^+ = A_n^- + K(a_n^{gps} - A_n^-) \qquad (5)$$

where:
A⁺=Acceleration estimate after update
A⁻=Acceleration estimate before update
$a^{imu}$=Inertial acceleration
Q=Process noise
P=Acceleration estimate covariance
$a^{gps}$=Pseudorange derived acceleration
n=current epoch
n−1=previous epoch
R=Measurement noise Now referring back to FIG. 3, the bias-removed acceleration 49 of the platform 10, the SV velocity 34, the direction vectors 38 and the compensated carrier phase range rates 40 are input to a processor 50. The processor 50 calculates the velocity of the platform 10. The processor 50 further includes a Kalman filter 52 for estimating constant carrier phase range rate errors and filtering these errors. These errors include the systematic errors found in the satellite-user GPS system. The following equation shows the typical carrier phase measurement and the associated errors:

$$CP = R_T + N\lambda + E_f + E_T + E_{CL} + E_{EPH} + E_{R_C} + E_{R_{UC}} \qquad (6)$$

where:
$R_T$=True Range
$N_\lambda$=Integer ambiguity
$E_f$=Residual error due to ionospheric delay after dual frequency correction
$E_T$=Residual error due to ionospheric delay after tropospheric correction model
$E_{CL}$=Error due to user clock offset
$E_{EPH}$=Precision Positioning Service ephemeris error including unmodeled SV clock error
$E_{RC}$=Correlated receiver error (i.e. multipath, tracking loop errors, inter-channel bias)
$E_{RUC}$=Uncorrelated receiver errors (measurement noise)

$$\Delta CP = \Delta R_T + \Delta N\lambda + \Delta E_f + \Delta E_T + \Delta E_{CL} + \Delta E_{EPH} + \Delta E_{R_C} + \Delta E_{R_{UC}} \qquad (7)$$

Because all terms in Equation 7 are close to a constant bias, each term can be estimated using the Kalman filter 52 and removed from the carrier phase range rates. The following sets forth the preferred state vector for the Kalman filter 52:

|     |   |                                    |
|-----|---|------------------------------------|
|     | $V_e$ | east velocity of platform       |
|     | $V_n$ | north velocity of platform      |
|     | $V_u$ | up velocity of platform         |
|     | $a_e$ | east acceleration of platform   |
|     | $a_n$ | north acceleration of platform  |
| x = | $a_u$ | up acceleration of platform     |
|     | f   | frequency offset of GPS receiver  |
|     | d   | frequency drift of GPS receiver   |
|     | $b_1$ | range rate bias for SV 1        |
|     | .   |                                   |
|     | .   |                                   |
|     | .   |                                   |
|     | $b_n$ | range rate bias for SV n        |
|     | x = | state vector                    |
|     | n = | number of SVs                   |

Figure 5:
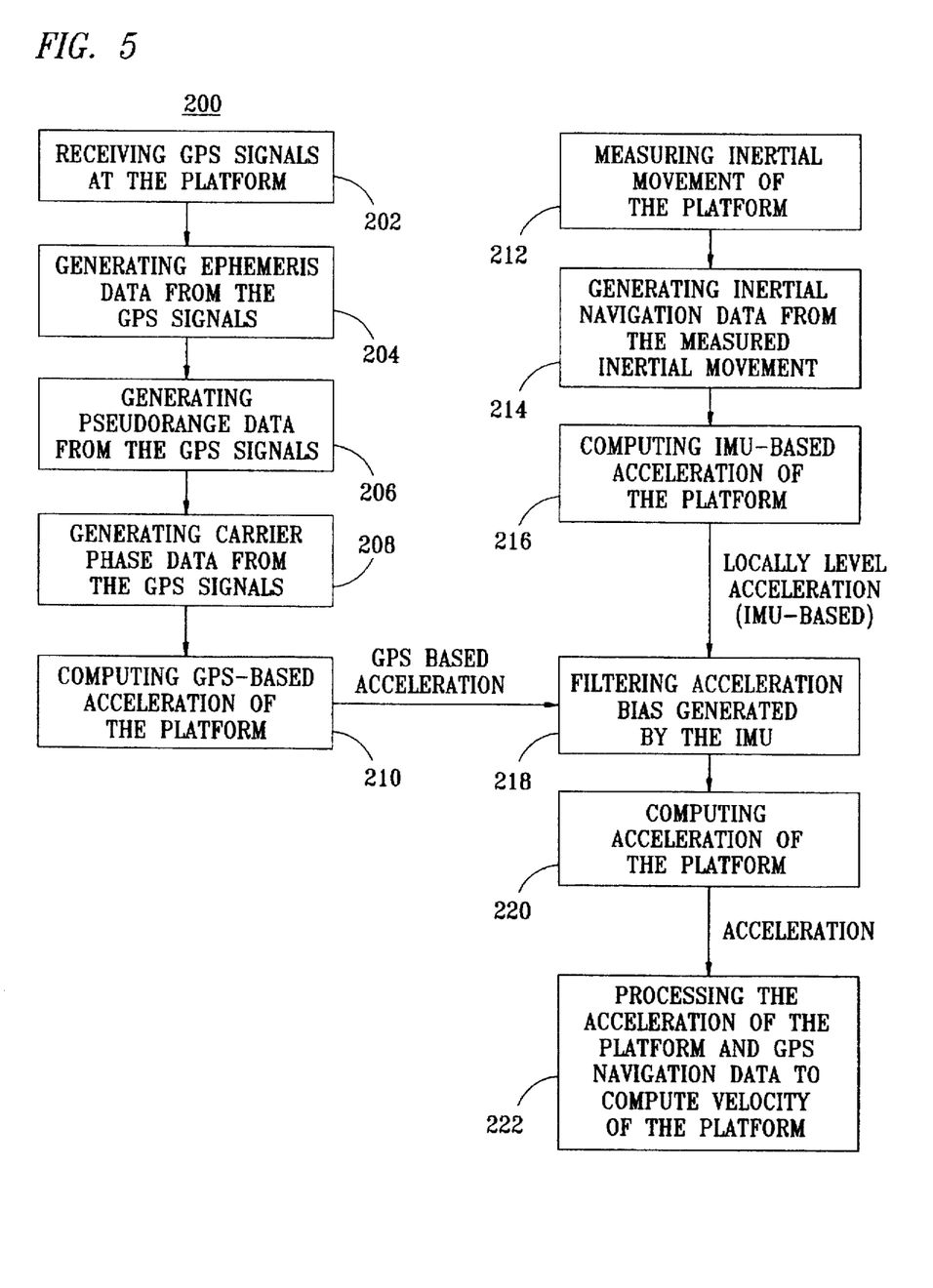
FIG. 5 illustrates a method for determining the velocity of a form without using a ground station.

Now referring to FIG. 5, there is shown a method 200 for determining the velocity of a platform without using a ground reference station. In a first step 202, a plurality of GPS signals 18 are received at the platform 10 by the antenna 16 of the GPS receiver 14. At a step 204, a step 206 and a step 208, the GPS receiver 14 generates ephemeris data 26, pseudorange data 28 and carrier phase range rate data 30, respectively. From this GPS data, the GPS-based acceleration 46 of the platform is computed at step 210.

In a step 212, inertial movement of the platform 10 is measured by the IMU 12 located at the platform 10. Inertial navigation data is generated at step 214 from the inertial movement measured by the IMU 12. From the inertial navigation data, the IMU-based acceleration of the platform 10 is computed at step 216 to generate the locally level acceleration 42.

In a step 218, the GPS-based acceleration 46 and the locally level acceleration (IMU-based acceleration) 42 are combined and filtered to substantially remove acceleration bias generated by the IMU 12. As will be appreciated, the filtering step 218 is performed by the acceleration bias remover 48 including the one-state Kalman filter 54. The equations for the Kalman filter 54 are described in detail in the preceding description. In step 220 the acceleration 49 of the platform 10 is computed. The acceleration 49 of the platform 10 and the GPS navigation data (ephemeris data 26, pseudorange data 28 and carrier phase range rate data 30) are processed in step 222 by the processor 24 and the velocity of the platform 10 is computed.

Figure 6:
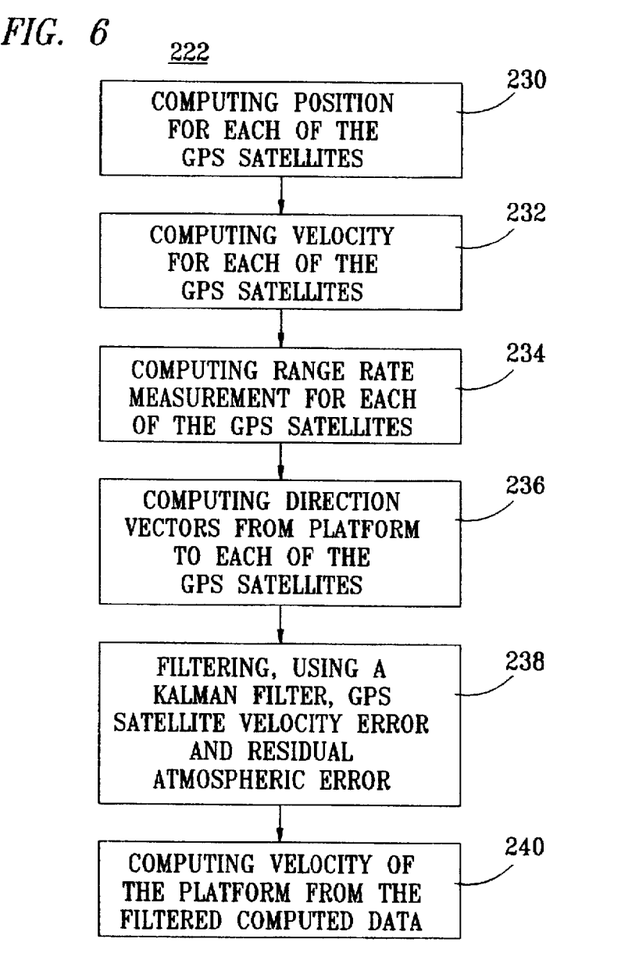
FIG. 6 illustrates the processing step shown in FIG. 5.

Now referring to FIG. 6, there is illustrated a detailed description of the processing step 222 shown in FIG. 5. The processor 24 computes the SV position 36 for each of the GPS satellites in step 230 and computes the SV velocity 34 of each of the GPS satellites in step 232. Further, in step 234, carrier phase range rates 40 are computed for each of the GPS satellites. In this same step, an ionospheric group delay and tropospheric delay 39 are calculated, respectively, using the L1 and L2 carrier frequencies and a tropospheric delay model that is well known in the art. The delays 39 are used to compensate for atmospheric delay associated with the GPS system and atmospheric compensated carrier phase range rates 40 (for each GPS satellite) are generated. In step 236, the processor 24 computes direction vectors relating to the direction of the platform 10 with respect to each of the GPS satellites.

Filtering, in step 238, substantially removes constant errors generated by the GPS system that occur in the carrier phase range rate measurement. These systematic errors have been described in detail in the above description of the carrier phase measurement equation. The filtering step 238 is performed, preferably, using an 8+n state Kalman filter 52, where n equals the number of GPS satellites used. The Kalman filter 52 includes six states accounting for acceleration and velocity of the platform 10, two states for frequency offset and frequency offset drift of GPS user clock, and n range rate bias states. In step 240, the velocity of the platform 10 is computed using the GPS navigation data and the acceleration of the platform in conjunction with the Kalman filter 52. Since most GPS receivers cannot provide accurate carrier phase range rate measurements at a very high rate, the propagation cycle of the Kalman filter 52 is used to provide a preferred update rate of about between 40–60 Hertz. This is accomplished by simply propagating forward the solution with the estimated acceleration and velocity of the platform 10.

Although a preferred embodiment of the present invention has been described in the foregoing detailed description and illustrated in the accompanying drawings, it will be understood by those skilled in the art that the invention is not limited to the embodiment disclosed but is capable of numerous rearrangements, substitutions and modifications without departing from the spirit of the invention.

What is claimed is:

1. An apparatus for generating a velocity signal indicative of the velocity of a platform using a satellite-based navigation system comprising:

a GPS receiver located at the platform for receiving a plurality of GPS signals from a corresponding plurality of GPS satellites and outputting GPS navigation data;

an inertial measurement unit located at the platform for outputting inertial navigation data indicative of the inertial movement of the platform;

a processor for generating an acceleration signal indicative of the acceleration of the platform by combining a first acceleration measurement of the platform calculated from the GPS navigation data with a second acceleration measurement of the platform calculated from the inertial navigation data; and said processor further generating the velocity signal from the acceleration signal and the GPS navigation data.

2. The apparatus in accordance with claim 1 wherein said processor includes:

a first Kalman filter for estimating GPS systematic errors in a carrier phase range rate from the GPS navigation data and for filtering said GPS systematic errors from the carrier phase range rate.

3. The apparatus in accordance with claim 2 wherein the first Kalman filter further includes a 8+n state vector Kalman filter where n equals the number of GPS satellites.

4. The apparatus in accordance with claim 3 wherein the 8+n state vector of the first Kalman filter comprises means for generating an east velocity component of the platform, a north velocity component of the platform, an up velocity component of the platform, an east acceleration component of the platform, a north acceleration component of the platform, an up acceleration component of the platform, a frequency offset of the GPS receiver, and a frequency drift of the GPS receiver.

5. The apparatus in accordance with claim 2 wherein the first Kalman filter updates the velocity signal at a rate substantially equal to or greater than 40 hertz.

6. The apparatus in accordance with claim 1 wherein the GPS navigation data comprises ephemeris data and pseudorange data.

7. The apparatus in accordance with claim 6 wherein the GPS navigation data includes carrier phase range rate and said processor further includes:

means for generating an atmospheric compensated carrier phase range rate from the carrier phase range rate;

means for generating a velocity measurement and a position measurement indicative of a position of the platform with relation to the GPS satellites; and means for generating a set of cosine direction vectors relating the platform to said GPS satellites using the velocity measurement, the position measurement and the pseudorange data.

8. The apparatus in accordance with claim 7 wherein the processor includes a first Kalman filter, said processor utilizes the atmospheric compensated carrier phase range rate, the velocity measurement of each of the GPS satellites, the set of cosine direction vectors, and the acceleration signal in conjunction with the first Kalman filter for generating the velocity signal.

9. The apparatus in accordance with claim 1 wherein said processor further includes an acceleration bias remover for filtering acceleration bias created by the inertial measurement unit.

10. The apparatus in accordance with claim 9 wherein said acceleration bias remover includes a Kalman filter having a single state.

11. An apparatus for generating a velocity signal indicative of the velocity of a platform using a satellite-based navigation system comprising:

a GPS receiver located at the platform for receiving a plurality of GPS signals from a corresponding plurality of GPS satellites and outputting GPS navigation data;

a processor for processing the GPS navigation data and generating a first acceleration measurement of the platform;

an inertial measurement unit located at the platform for outputting inertial navigation data indicative of the inertial movement of the platform;

said processor generating a second acceleration measurement of the platform based on the inertial navigation data;

an acceleration bias remover for receiving and combining the first acceleration measurement and the second acceleration measurement and substantially removing an acceleration bias generated by the inertial measurement unit to generate a third acceleration measurement of the platform; and said processor further generating a velocity signal from the GPS navigation data and the third acceleration measurement.

12. The apparatus in accordance with claim 11 wherein the acceleration bias remover includes a first Kalman filter.

13. The apparatus in accordance with claim 12 wherein the first Kalman filter includes a one state Kalman filter to substantially removing bias from the first acceleration measurement.

14. The apparatus in accordance with claim 13 wherein said processor further includes a second Kalman filter for filtering GPS systematic errors and a platform acceleration error from the third acceleration measurement.

15. The apparatus in accordance with claim 14 wherein the second Kalman filter includes a 8+n state Kalman filter where n equals the number of GPS satellites.

16. A method for generating a velocity signal indicative of the velocity of a platform using a satellite-based navigation system comprising the steps of:

receiving a plurality of GPS navigation signals at the platform from a plurality of GPS satellites;

generating GPS navigation data from the plurality of GPS navigation signals;

measuring inertial movement of the platform using an inertial measurement unit;

generating inertial navigation data from the measured inertial movement;

calculating a platform acceleration measurement indicative of the acceleration of the platform, said calculating including the steps of:

computing a GPS-based platform acceleration measurement using the GPS navigation data;

computing an IMU-based platform acceleration measurement using the inertial navigation data; and generating the platform acceleration measurement from the GPS-based platform acceleration measurement and the IMU-based platform acceleration measurement; and processing the GPS navigation data and the platform acceleration measurement to generate the velocity signal.

17. The method in accordance with claim 16 wherein the step of generating the platform acceleration measurement comprises the step of removing a substantial portion of an acceleration bias generated by the inertial measurement unit.

18. The method in accordance with claim 17 wherein the step of removing the acceleration bias generated by the inertial measurement unit further comprises the steps of:

inputting the GPS-based platform acceleration measurement to an acceleration bias remover;

inputting the IMU-based platform acceleration measurement to the acceleration bias remover; and filtering, within the acceleration bias remover, the GPS-based platform acceleration measurement and the IMU-based platform acceleration measurement using a Kalman filter and outputting the platform acceleration measurement.

19. The method in accordance with claim 18 wherein the step of filtering includes using a one state Kalman filter.

20. The method in accordance with claim 16 wherein the step of processing the GPS navigation data and the platform acceleration measurement to generate the velocity signal further includes the steps of:

computing a position measurement and a velocity measurement for each GPS satellite using ephemeris data from the GPS navigation signals;

computing a set of direction vectors in response to the velocity measurement, the position measurement and pseudorange data associated with each GPS satellite, each direction vector relates to the direction of the platform with respect to each GPS satellite; and computing a range rate measurement for each GPS satellite using a carrier phase range rate from the GPS navigation data.

21. The method in accordance with claim 20 wherein the step of processing the GPS navigation data and the platform acceleration measurement to generate the velocity signal further comprises the step of processing the acceleration measurement of the platform, the computed set of direction vectors, the computed range rate measurements, and the computed velocity measurement of each GPS satellite to compute the velocity signal.

22. The method in accordance with claim 21 wherein the step of processing the GPS navigation data and the platform acceleration measurement to generate the velocity signal further comprises the step of filtering GPS satellite system errors relating to the carrier phase range rate using a Kalman filter.

23. The method in accordance with claim 22 wherein the step of filtering includes filtering in an 8+n state Kalman filter where n equals the number of GPS satellites.

24. The method in accordance with claim 16 wherein the step of generating GPS navigation data comprises the steps of:

generating ephemeris data;

generating pseudorange data; and generating a carrier phase range rate.

25. The method in accordance with claim 24 wherein the step of processing the GPS navigation data and the platform acceleration measurement to generate the velocity signal further comprises the steps of:

computing a position measurement and a velocity measurement for each GPS satellite using ephemeris data from the GPS navigation signals;

computing a set of direction vectors in response to the velocity measurement, the position measurement and pseudorange data associated with each GPS satellite, each direction vector relates to the direction of the platform with respect to each GPS satellite; and computing a range rate measurement for each GPS satelite using a carrier phase range rate from the GPS navigation data.

26. The method in accordance with claim 25 wherein the step of processing the GPS navigation data and the platform acceleration measurement to generate the velocity signal further comprises the step of processing the acceleration measurement of the platform, the computed set of direction vectors, the computed range rate measurements, and the computed velocities of each GPS satellites to compute the velocity signal.

27. The method in accordance with claim 26 wherein the step of processing the GPS navigation data and the platform acceleration measurement to generate the velocity signal further comprises the step of filtering GPS satellite system errors relating to the carrier phase range rate using a Kalman filter.

28. The method in accordance with claim 27 wherein the step of filtering further includes filtering by means of an 8+n state Kalman filter where n equals the number of GPS satellites.

29. The apparatus in accordance with claim 28 wherein the 8+n state Kalman filter includes a state vector comprising:

an east velocity component of the platform;

a north velocity component of the platform;

an up velocity component of the platform;

an east acceleration component of the platform;

a north acceleration component of the platform;

an up acceleration component of the platform;

a frequency offset of the GPS receiver;

a frequency drift of the GPS receiver; and an n plurality of states for range rate bias of each of the GPS satellites.

30. A method for generating a velocity signal indicative of the velocity of a platform using a satellite-based navigation system comprising the steps of:

receiving a plurality of GPS navigation signals at the platform from a plurality of GPS satellites;

generating GPS navigation data from the plurality of navigation signals;

generating a GPS-based acceleration measurement of the platform from the GPS navigation data;

measuring inertial movement of the platform using an inertial measurement unit;

generating inertial navigation data from the measured inertial movement;

generating an IMU-based acceleration measurement of the platform from the inertial navigation data;

computing a platform acceleration measurement from the GPS-based acceleration measurement and the IMU-based acceleration measurement using a first Kalman filter; and processing the GPS navigation data and the platform acceleration measurement to generate the velocity signal.

31. The method in accordance with claim 30 wherein the step of processing the GPS navigation data and the platform acceleration measurement to generate the velocity signal further comprises the steps of:

computing a position measurement and a velocity measurement for each GPS satellite using the GPS navigation data;

computing a set of direction vectors using the GPS navigation data, each direction vector relating to the direction of the platform with respect to each GPS satellite;

computing a carrier phase range rate measurement for each GPS satellite using the GPS navigation data; and filtering GPS satellite systematic errors relating to the carrier phase range rate measurement using a second Kalman filter.

32. The method in accordance with claim 31 wherein the step of filtering includes using an 8+n state Kalman filter where n equals the number of GPS satellites.

33. A method for generating a velocity signal indicative of the velocity of a platform using a satellite-based navigation system comprising the steps of:

generating ephemeris data, pseudorange data, and carrier phase data from a received GPS signal;

computing a GPS satellite velocity measurement and a GPS satellite position measurement in response to the ephemeris data;

computing a GPS-based acceleration measurement of the platform from the pseudorange data, the GPS satellite velocity measurement, the GPS satellite position measurement, and the carrier phase data using a least squares acceleration calculation;

computing an IMU-based acceleration measurement of the platform from an acceleration measurement received from a platform positioned inertial measurement unit;

combining the GPS-based acceleration measurement and the IMU-based acceleration measurement to determine an acceleration signal indicative of the acceleration of the platform; and computing the velocity signal using the pseudorange data, the carrier phase data, the GPS satellite velocity measurement, the GPS satellite position measurement, and the acceleration signal.

34. The method in accordance with claim 33 wherein the step of combining includes the step of removing an acceleration bias generated by the inertial measurement unit from the IMU-based acceleration measurement by means of a first Kalman filter.

35. The method in accordance with claim 34 wherein the step of computing the velocity signal further includes the step of processing and filtering the pseudorange data, the carrier phase data, the GPS satellite velocity measurement, the GPS satellite position measurement, and the acceleration signal using an 8+n state Kalman filter, where n equals the number of GPS satellites.

36. An apparatus for determining a velocity signal indicative of the velocity of a platform using a satellite-based navigation system comprising:

a GPS receiver located at the platform for receiving a plurality of GPS signals from a corresponding plurality of GPS satellites and outputting GPS navigation data;

an inertial measurement unit located at the platform for outputting inertial navigation data related to the inertial movement of the platform;

a processor for generating an acceleration signal indicative of the acceleration of the platform in accordance with a least square acceleration calculation utilizing the GPS navigation data and the inertial navigation data; and said processor further generating the velocity signal in accordance with a computation utilizing the acceleration signal and the GPS navigation data.

37. The apparatus in accordance with claim 36 wherein said processor further includes a first Kalman filter for estimating GPS systematic errors in a carrier phase range rate from the GPS navigation data and for filtering said GPS systematic errors from the carrier phase range rate.

38. The apparatus in accordance with claim 37 wherein the first Kalman filter further includes a 8+n state vector Kalman filter where n equals the number of GPS satellites.

39. The apparatus in accordance with claim 38 wherein the 8+n state vector of the first Kalman filter comprises means for generating an east velocity component of the platform, a north velocity component of the platform, an up velocity component of the platform, an east acceleration component of the platform, a north acceleration component of the platform, an up acceleration component of the platform, a frequency offset of the GPS receiver, and a frequency drift of the GPS receiver.

40. The apparatus in accordance with claim 37 wherein the first Kalman filter updates the velocity signal at a rate substantially equal to or greater than 40 hertz.

41. The apparatus in accordance with claim 36 wherein the GPS receiver outputs GPS navigation data that includes ephemeris data and pseudorange data.

42. The apparatus in accordance with claim 41 wherein said processor further includes:

means for generating an atmospheric compensated carrier phase range rate from a carrier phase range rate;

means for generating a velocity measurement and a position measurement indicative of a position of the platform with relation to the GPS satellites; and means for generating a set of cosine direction vectors relating the platform to said GPS satellites from the velocity measurement, the position measurement and the pseudorange data.

43. The apparatus in accordance with claim 42 wherein the processor responds to the atmospheric compensated carrier phase range rate, the velocity measurement of each of the GPS satellites, the set of cosine direction vectors, and the acceleration signal in conjunction with the first Kalman filter for generating the velocity signal.

* * * * *